United States Patent
Nakai et al.

(10) Patent No.: US 10,359,315 B2
(45) Date of Patent: Jul. 23, 2019

(54) COLORIMETRY APPARATUS AND IMAGE FORMING APPARATUS

(71) Applicant: CANON KABUSHIKI KAISHA, Tokyo (JP)

(72) Inventors: Tomoaki Nakai, Numazu (JP); Akihiko Uchiyama, Mishima (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 15/460,364

(22) Filed: Mar. 16, 2017

(65) Prior Publication Data

US 2017/0184454 A1 Jun. 29, 2017

Related U.S. Application Data

(63) Continuation of application No. 13/951,869, filed on Jul. 26, 2013, now abandoned.

(30) Foreign Application Priority Data

Jul. 30, 2012 (JP) .................................. 2012-168501
Jul. 16, 2013 (JP) .................................. 2013-147644

(51) Int. Cl.
*G01J 3/50* (2006.01)
*G01J 1/04* (2006.01)
(Continued)

(52) U.S. Cl.
CPC ............. *G01J 3/502* (2013.01); *G01J 1/0488* (2013.01); *G01J 3/18* (2013.01); *G01J 3/50* (2013.01);
(Continued)

(58) Field of Classification Search
CPC ...... G01J 3/502; G01J 3/18; G01J 3/02; G01J 3/0208; G01J 3/2803; G01J 3/28;
(Continued)

(56) References Cited

U.S. PATENT DOCUMENTS 5,262,840 A 11/1993 Stearns et al.
5,319,433 A 6/1994 Fukushima et al.
(Continued)

FOREIGN PATENT DOCUMENTS

JP H06-011943 A 1/1994
JP H08-011943 A 1/1996
(Continued)

OTHER PUBLICATIONS http://www.thefreedictionary.com/path.
(Continued)

*Primary Examiner* — Mohamed K Amara
(74) *Attorney, Agent, or Firm* — Venable LLP

(57) ABSTRACT

The colorimetry apparatus includes a light source for emitting light to a surface of a detected object, a diffraction grating for spectrally separating, for each wavelength, the light emitted from the light source and reflected by the detected object, and a line sensor including multiple pixels, for receiving the light, which is spectrally separated by the diffraction grating, for the each wavelength by the multiple pixels. The light source and the line sensor are arranged on the common substrate.

22 Claims, 11 Drawing Sheets

(51) Int. Cl.
*G03G 15/00* (2006.01)
*G03G 15/01* (2006.01)
*G01J 3/18* (2006.01)

(52) U.S. Cl.
CPC ......... *G03G 15/01* (2013.01); *G03G 15/5062* (2013.01); *G03G 2215/00257* (2013.01)

(58) Field of Classification Search
CPC ...... G01J 3/2823; G01J 3/0291; G01J 3/0256; G01J 3/021; G01J 3/0229; G01J 3/10; G01J 3/0205; G01J 3/0259; G01J 3/1804; G01J 3/0272; G01J 3/524; G03G 15/01; G01N 21/31; G01N 21/3563
See application file for complete search history.

(56) References Cited

U.S. PATENT DOCUMENTS

| | | | |
|---|---|---|---|
| 5,476,108 A | 12/1995 | Dominguez et al. | |
| 5,489,980 A * | 2/1996 | Anthony | G01J 3/06 356/308 |
| 5,737,113 A | 4/1998 | Kuramochi et al. | |
| 5,880,834 A | 3/1999 | Chrisp | |
| 6,449,045 B1 * | 9/2002 | Mestha | G01J 3/46 356/402 |
| 6,469,785 B1 * | 10/2002 | Duveneck | G01N 21/648 356/244 |
| 6,507,437 B1 | 1/2003 | Nakai | |
| 6,560,019 B2 | 5/2003 | Nakai | |
| 6,587,272 B2 | 7/2003 | Nakai | |
| 6,650,477 B2 | 11/2003 | Nakai | |
| 6,829,093 B1 | 12/2004 | Nakai | |
| 7,067,819 B2 * | 6/2006 | Janik | G01J 3/10 250/252.1 |
| 7,092,090 B2 | 8/2006 | Shimizu et al. | |
| 7,119,337 B1 | 10/2006 | Johnson et al. | |
| 7,315,378 B2 * | 1/2008 | Phelan | G01N 21/4738 356/39 |
| 7,359,052 B2 * | 4/2008 | Fielden | G01J 3/10 356/369 |
| 7,502,109 B2 * | 3/2009 | Bonne | G01F 1/6845 356/328 |
| 7,817,274 B2 * | 10/2010 | Zhang | G01J 3/02 356/328 |
| 8,462,342 B2 * | 6/2013 | Kobayashi | G01J 3/02 356/402 |
| 8,502,148 B2 | 8/2013 | Wagner et al. | |
| 8,755,046 B2 * | 6/2014 | Shimbo | G01J 3/2823 356/328 |
| 8,822,925 B1 | 9/2014 | Patel et al. | |
| 8,964,176 B2 * | 2/2015 | Kamijo | G01J 3/0297 356/303 |
| 2003/0169421 A1 | 9/2003 | Ehbets | |
| 2007/0182961 A1 * | 8/2007 | Chadha | G01J 3/02 356/328 |
| 2008/0094624 A1 | 4/2008 | Harsh et al. | |
| 2009/0262346 A1 * | 10/2009 | Egloff | G01J 3/02 356/326 |
| 2010/0278543 A1 | 11/2010 | Takizawa et al. | |
| 2011/0216315 A1 * | 9/2011 | Uematsu | G01J 3/02 356/326 |
| 2011/0299104 A1 | 12/2011 | Seo et al. | |
| 2011/0317149 A1 | 12/2011 | Shimbo et al. | |
| 2012/0074301 A1 * | 3/2012 | Kroese | G01J 1/0488 250/226 |
| 2013/0016352 A1 * | 1/2013 | Kita | G01J 3/501 356/402 |
| 2013/0114077 A1 * | 5/2013 | Zhang | G01J 3/02 356/328 |
| 2013/0242308 A1 * | 9/2013 | Zhan | G01N 21/8483 356/445 |
| 2016/0011048 A1 * | 1/2016 | Niggl | G01N 21/253 356/328 |
| 2016/0084757 A1 * | 3/2016 | Miron | G01N 21/39 356/437 |
| 2016/0205287 A1 * | 7/2016 | Obara | H04N 1/6044 358/1.9 |

FOREIGN PATENT DOCUMENTS

| | | |
|---|---|---|
| JP | 2001-217453 A | 8/2001 |
| JP | 2001-235368 A | 8/2001 |
| JP | 2003-114187 A | 4/2003 |
| JP | 2005-164300 A | 6/2005 |
| JP | 2006-208266 A | 8/2006 |
| JP | 2009-008471 A | 1/2009 |
| JP | 2010-211055 A | 9/2010 |
| JP | 2012-013437 A | 1/2012 |

OTHER PUBLICATIONS http://www.thefreedictionary.com/substrate.
Espacenet machine translation of Kinugasa et al. (JP 2001-235368 A).

* cited by examiner

COLORIMETRY APPARATUS AND IMAGE FORMING APPARATUS

This application is a continuation of application Ser. No. 13/951,869 filed Jul. 26, 2013.

BACKGROUND OF THE INVENTION

Field of the Invention

The present invention relates to a colorimetry apparatus and an image forming apparatus.

Description of the Related Art

In recent years, a color image forming apparatus such as a color printer and a color copier is required to output images with higher image quality. In particular, stability of image gradation and image color significantly affects the image quality. However, change of environment such as temperature or humidity, or long-term use of the color printer causes change of tint of an obtained image. Therefore, in order to realize stable tint, it is necessary to detect the tint of the image by using a colorimetry sensor and to provide feedback for a process condition of the image forming apparatus.

Conventionally, as one of devices for measuring tint (chromaticity) of a color of a printed matter or an object, there is used a colorimetry device. As a general colorimetry device, there is a filter type colorimetry device in which white color light is emitted to a detected object, and reflection light is received by a light receiving sensor through an RGB color filter so as to measure intensity of each color component. In addition, there is known a spectral colorimetry device in which wavelength dispersion of the reflection light is performed by using a diffraction grating, a prism, or the like, then intensity is detected for each wavelength by a line sensor, and spectral reflectance of the detected object is determined through calculation considering a wavelength distribution of the detected dispersed light, a wavelength distribution of light from a light source, spectral sensitivity of the sensor, and the like. The spectral colorimetry device is advantageous in view of the accuracy in colorimetry, and hence the spectral colorimetry device is used in many cases as a colorimetry sensor that is used for control for stabilizing tint of a color printer. Japanese Patent Application Laid-Open No. 2009-008471 proposes a spectral colorimetry device that can measure paper color information with high accuracy even if the paper sheet is conveyed in a fluttering state. In addition, Japanese Patent Application Laid-Open No. 2010-211055 proposes an image forming apparatus that uses the spectral colorimetry device to control a fixing condition with high accuracy even if a toner adhering amount fluctuates.

However, the conventional spectral colorimetry device has the following problems.

First, the spectral colorimetry device has high accuracy in colorimetry, but cost thereof is high. In particular, if a distance from the light source to the detected object is long, it is necessary to increase a light emission amount in order to secure intensity of light emitted to the detected object. As a result, there are risks such as increase of cost for a circuit of supplying a larger current and increase of cost of a light emission element. In addition, as described above, if the distance from the light source to the detected object is long, a size of the spectral colorimetry device is increased. In this case, a size of the image forming apparatus itself including the colorimetry device is increased, and hence cost of the entire apparatus is increased.

In addition, in the spectral colorimetry device, the wavelength dispersion of the reflection light is performed by using the diffraction grating, the prism, or the like, and then the intensity is detected for each wavelength by the line sensor. Therefore, if a position of the line sensor is fluctuated by thermal deformation of the spectral colorimetry device, detection accuracy may be lowered. Here, a housing of the spectral colorimetry device is usually made of a mold resin in view of easiness of molding, cost, weight, and the like. Therefore, if an ambient temperature rises during a period after the image forming apparatus is produced until the image forming apparatus is delivered to a user, the temperature of the housing of the spectral colorimetry device also rises. As a result, even after returning to room temperature, the thermal deformation (creep) of the device may be fixed. In addition, if the image forming apparatus is an electrophotographic image forming apparatus, heat generated in a fixing process may be transferred to the spectral colorimetry device so that thermal deformation is caused. A positional fluctuation of the line sensor due to the thermal deformation is insignificant, but the positional fluctuation may affect detection accuracy of the spectral colorimetry device having a structure in which the wavelength dispersion of the reflection light is performed by using the diffraction grating, the prism, or the like, and then the light is detected by the line sensor.

In addition, in order to arrange the spectral colorimetry device in the image forming apparatus, it is necessary to secure a space for the spectral colorimetry device as a matter of course. However, if the spectral colorimetry device is large in size, it is necessary to increase also a size of the image forming apparatus, which may degrade a commercial value of the image forming apparatus. Therefore, it is preferred that the spectral colorimetry device have a smaller size.

However, the spectral colorimetry device needs the light source, the diffraction grating or the prism, the line sensor, and the like, and further needs an optical guide member for guiding the reflection light to the diffraction grating or the prism, the line sensor, and the like, and a lens or the like for collimating light. Further, in order that the light subjected to the wavelength dispersion by the diffraction grating or the prism can be appropriately detected by the line sensor, the spectral colorimetry device needs a certain extent of an optical path length, which is one of factors that prevent downsizing of the spectral colorimetry device.

SUMMARY OF THE INVENTION

It is an object of the present invention to reduce cost of a colorimetry apparatus or to suppress lowering of detection accuracy of the colorimetry apparatus.

In addition, it is another object of the present invention to provide the following colorimetry apparatus.

That is, the colorimetry apparatus includes: a light emission element for emitting light to a surface of a detected material; a diffraction grating for spectrally separating, for each wavelength, the light emitted from the light emission element and reflected by the detected material for each wavelength; and a light receiving element including multiple pixels, for receiving spectral light, which is spectrally separated by the diffraction grating, for the each wavelength by the multiple pixels. The light emission element and the light receiving element are arranged on the same substrate.

In addition, it is still another object of the present invention to provide the following image forming apparatus.

That is, the image forming apparatus includes an image forming unit for forming an image on a recording material; a light emission element for emitting light to a surface of the recording material; a diffraction grating for spectrally separating, for each wavelength, the light emitted from the light emission element and reflected by the recording material; and a light receiving element including multiple pixels, for receiving spectral light, which is spectrally separated by the diffraction grating, for the each wavelength by the multiple pixels; and a control unit for adjusting an image formation condition of the image forming unit based on an output from the light receiving element. The light emission element and the light receiving element are arranged on the same substrate.

Further features of the present invention will become apparent from the following description of exemplary embodiments with reference to the attached drawings.

BRIEF DESCRIPTION OF THE DRAWINGS

FIG. 6A is a diagram illustrating an XY cross section of the spectral colorimetry device according to the second embodiment of the present invention, as viewed from a direction perpendicular to a detected surface of a detected material. FIG. 6B is a diagram illustrating an XZ cross section of the spectral colorimetry device according to the second embodiment of the present invention, as viewed from a front of the spectral colorimetry device.

DESCRIPTION OF THE EMBODIMENTS

Now, exemplary embodiments of the present invention are described in detail with reference to the attached drawings. Note that, dimensions, materials, shapes, relative positions of components, and the like to be described in the embodiments may be changed as appropriate depending on the structure of an apparatus to which the present invention is applied, or various conditions. Therefore, the scope of the present invention is not intended to be limited only to those embodiments.

The present invention relates to an image forming apparatus such as an inkjet or electrophotographic copier or printer, and more particularly, to a colorimetry apparatus for measuring a color of an image (a patch colorimetry) output by the image forming apparatus.

First Embodiment

Now, a first embodiment of the present invention is described.

Figure 1A:
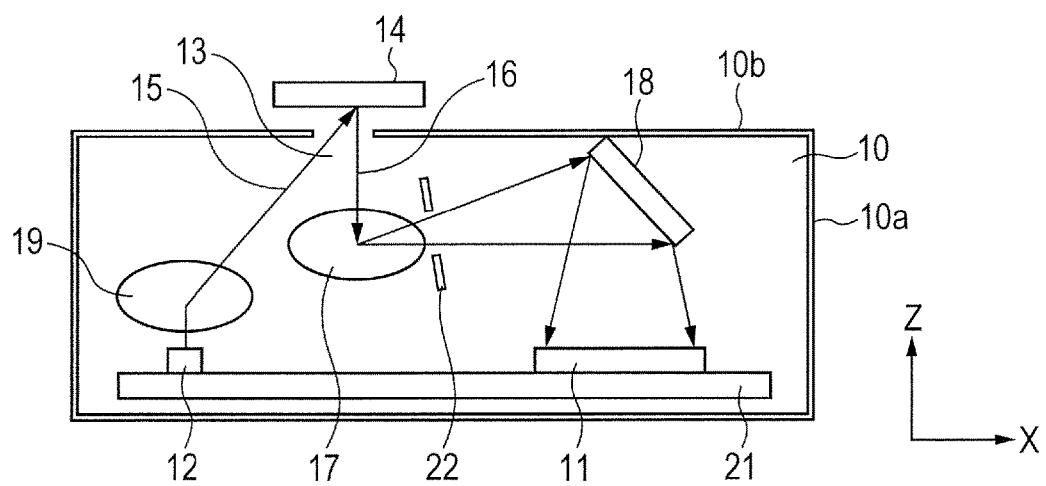
FIGS. 1A and 1B are explanatory diagrams illustrating a schematic structure of a spectral colorimetry device according to a first embodiment of the present invention.

FIG. 1A is an explanatory diagram illustrating a schematic structure of a spectral colorimetry device 10 as a colorimetry apparatus of this embodiment. Here, as illustrated in FIG. 1A, a direction perpendicular to a detected surface (surface) of a detected object (hereinafter referred to as a detected material) 14 is defined as a Z direction, a longitudinal direction of the spectral colorimetry device 10 is defined as an X direction, a height direction of the spectral colorimetry device 10 (front direction of the apparatus) is defined as a Y direction. In other words, FIG. 1A illustrates an XZ cross section of the spectral colorimetry device 10.

The spectral colorimetry device 10 of this embodiment includes a white color light source (hereinafter referred to as a light source) 12 having a light emission wavelength distribution over the entire visible light range, an emission-side light condensing and guiding lens (hereinafter referred to as an emission light guide) 19, an incident-side light condensing and guiding lens (hereinafter referred to as an incident light guide) 17, a slit 22, a diffraction grating (concave reflection diffraction grating) 18, and a charge accumulation type line sensor (hereinafter referred to as a line sensor) 11 having multiple pixels. Here, the light source 12 corresponds to a light emission element. In addition, the diffraction grating 18 corresponds to a spectral unit. In addition, the line sensor 11 corresponds to a light receiving element.

Figure 8A:
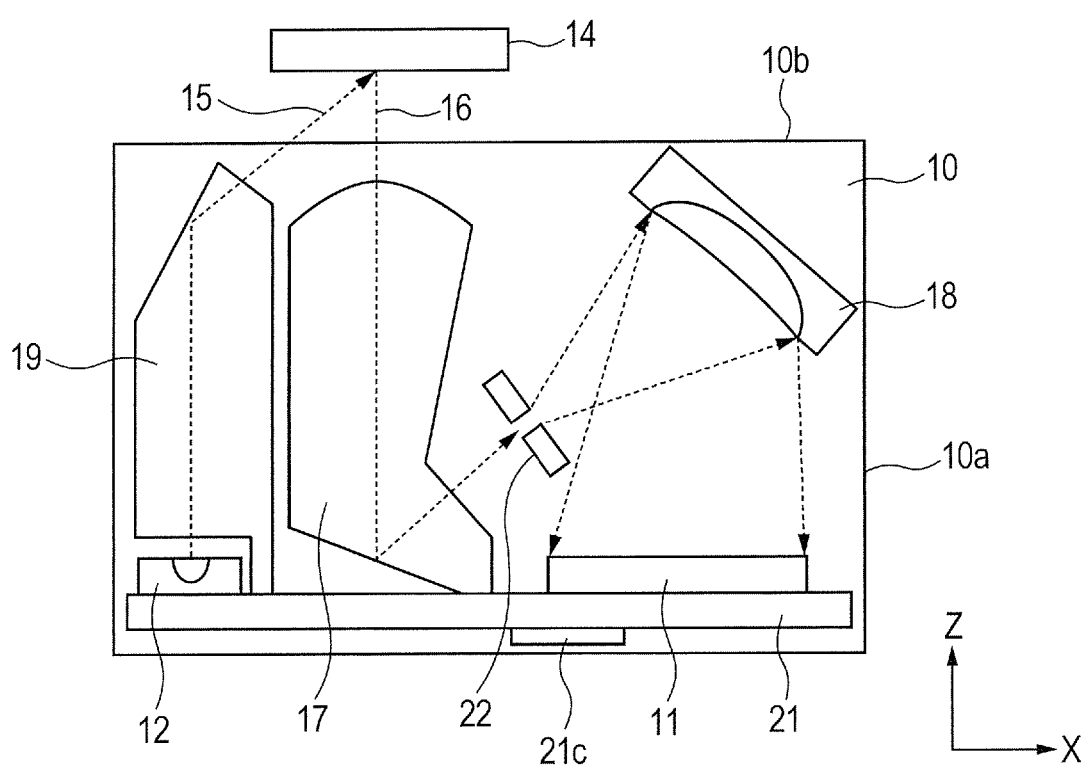
FIG. 8A is a diagram illustrating an XZ cross section of the spectral colorimetry device of the first embodiment.
Figure 8B:
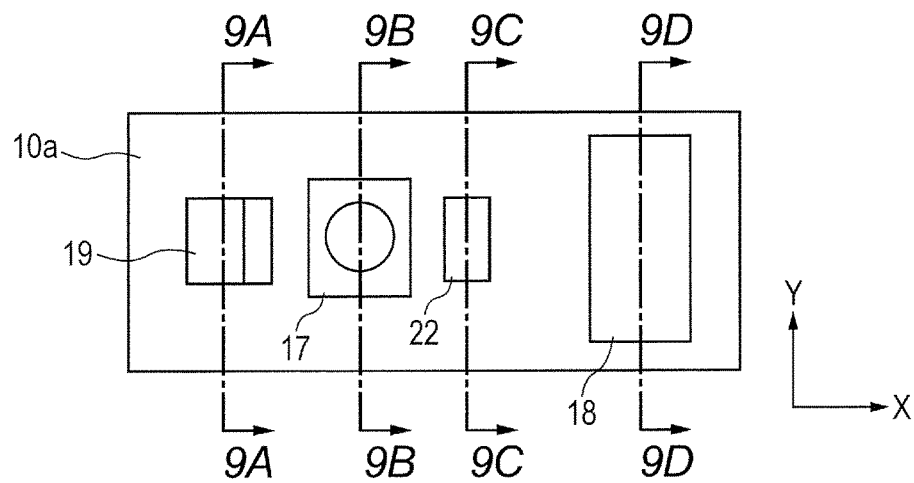
FIG. 8B is a diagram illustrating an XY cross section of the spectral colorimetry device of the first embodiment.
Figure 9A:
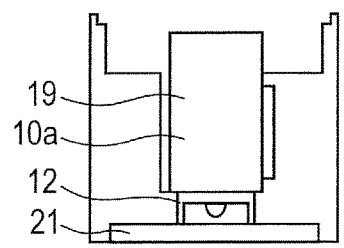
FIGS. 9A, 9B, 9C, and 9D are diagrams illustrating a cross section 9A, a cross section 9B, a cross section 9C, and a cross section 9D of FIG. 8B, respectively.
Figure 9B:
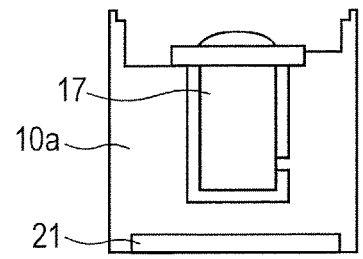
Figure 9C:
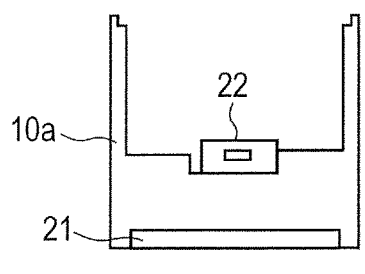
Figure 9D:
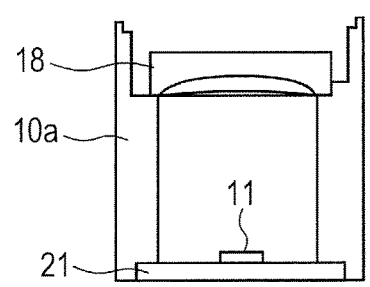

This embodiment has a feature in that the light source 12 and the line sensor 11 are mounted (arranged) on the same substrate 21 (surface of the substrate 21, on the same substrate). The substrate 21 is suitably made of epoxy resin-impregnated paper or a laminated glass fiber fabric impregnated with an epoxy resin. With reference to FIGS. 8A, 8B, 9A, 9B, 9C, and 9D, a more specific structure of the spectral colorimetry device 10 of this embodiment is described. FIG. 8A illustrates an XZ cross section of the spectral colorimetry device 10. FIG. 8B illustrates an XY cross section of the spectral colorimetry device 10 as viewed from the Z direction.

On the substrate 21, there is arranged a control and operation unit 21c for controlling operation of the spectral colorimetry device 10. The control and operation unit 21c includes a circuit for controlling a light emission amount and a light emission timing of the light source 12, and an operation circuit for processing a signal output from the line sensor 11. The spectral colorimetry device 10 includes a casing 10a and a lid 10b constituting the housing. The emission light guide 19, the incident light guide 17, the slit 22, the diffraction grating 18, and the substrate 21 are fixed to the casing 10a of the housing at respective positions.

Next, a method of positioning and fixing the emission light guide 19, the incident light guide 17, the slit 22, and the diffraction grating 18 to the casing 10a is described. FIGS. 9A, 9B, 9C, and 9D are diagrams illustrating a cross section 9A, a cross section 9B, a cross section 9C, and a cross section 9D of FIG. 8B, respectively. The cross section 9A illustrates a relationship between the emission light guide 19 and the casing 10a. The emission light guide 19 is positioned so as to abut against the casing 10a in the Y direction (direction of an arrow) and is fixed in this state to the casing 10a with an ultraviolet curing adhesive. Similarly, the incident light guide 17 in the cross section 9B, the slit 22 in the cross section 9C, and the diffraction grating 18 in the cross section 9D are positioned so as to abut against the casing 10a in the Y direction and are fixed in this state at the respective positions to the casing 10a with an ultraviolet curing adhesive.

Figure 10A:
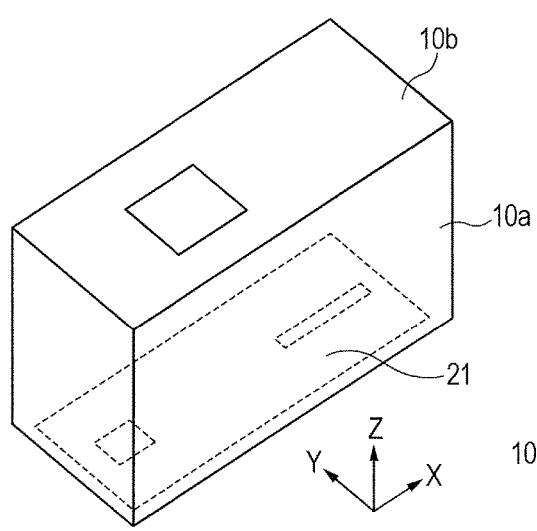
FIG. 10A is a diagram illustrating a housing of the spectral colorimetry device of the first embodiment in an assembled state.
Figure 10B:
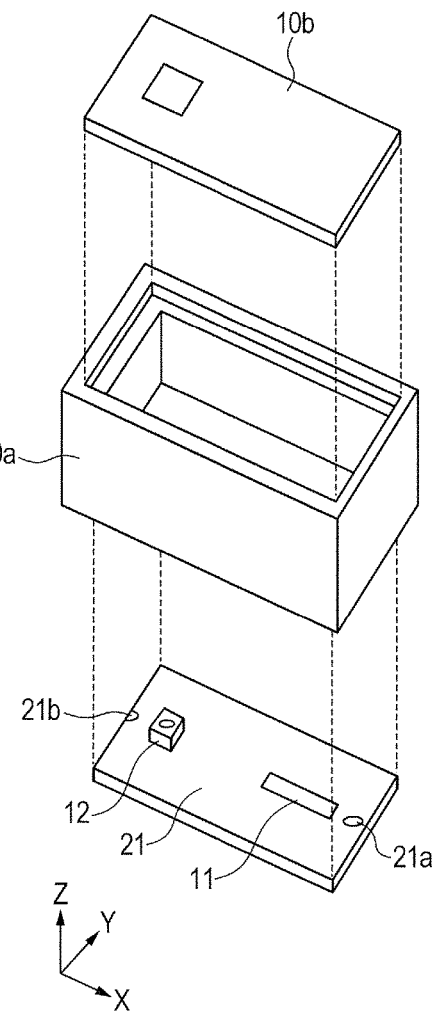
FIG. 10B is a diagram illustrating the housing of the spectral colorimetry device of the first embodiment in an exploded state before assembly.

Next, with reference to FIGS. 10A and 10B, a relationship among the casing 10a, the lid 10b, and the substrate 21 is described in detail. FIGS. 10A and 10B are perspective views of the housing. FIG. 10A illustrates a state where the housing of the spectral colorimetry device 10 is assembled. FIG. 10B illustrates an exploded state before the housing of the spectral colorimetry device 10 is assembled. Here, the emission light guide 19, the incident light guide 17, the slit 22, and the diffraction grating 18, which are fixed to the inside, are not illustrated in the diagrams. As understood from the diagrams, the lid 10b and the substrate 21 are fixed to the casing 10a in the Z direction. The lid 10b is positioned when the lid 10b is fitted to a groove formed in the casing 10a and is fixed with an ultraviolet curing adhesive. On the other hand, the substrate 21 is provided with a datum hole 21a serving as a reference for positioning in the X direction and in the Y direction. The datum hole 21a is fitted onto a boss (not shown) formed on the casing 10a so that the substrate 21 is positioned in the X direction and in the Y direction. Further, a notch portion 21b is formed in the substrate 21, and this portion is fitted onto a protrusion (not shown) formed on the casing 10a to serve as a rotation stopper about the Z axis for the substrate 21. The substrate 21 is fixed to the casing 10a with an ultraviolet curing adhesive.

Light 15 emitted from the light source 12 is condensed by the emission light guide 19 on the emission side, and a direction of the light 15 is changed so that the light 15 enters the detected surface of the detected material 14 at an angle of approximately 45° through an aperture 13. Here, the color of the detected material 14 is measured at a preset position of the spectral colorimetry device 10 (position opposed to the aperture 13 arranged in the Z direction of the spectral colorimetry device 10 as illustrated in an upper part of FIG. 1A).

The light 15 entering the detected material 14 at an angle of approximately 45° becomes scattered light (reflection light) in accordance with an optical absorption characteristic of the detected material 14. A part of scattered light 16 is received by the incident light guide on the incident side to become collimated light, and then a direction of the light is changed so that the light enters the slit 22. Further, the scattered light 16 passes through the slit 22 and enters the diffraction grating 18. The scattered light 16 entering the diffraction grating 18 is reflected by the diffraction grating 18 and is then spectrally separated by the diffraction grating 18 to become a spectral light beam spectrally separated and condensed for each wavelength. The line sensor 11 is arranged substantially on a tangent of a Rowland circle (not shown) of the diffraction grating 18, and the spectral light beam is received and detected by the pixels for each wavelength.

In a case of the structure of this embodiment illustrated in FIG. 1A, a center axis of the Rowland circle (not shown) is orthogonal to the X direction axis and to the Z direction axis, and is parallel to the detected surface of the detected material.

Figure 1B:
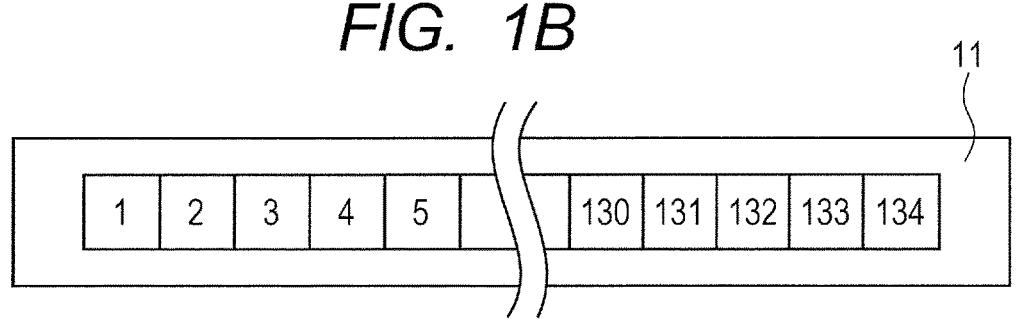

FIG. 1B is a schematic diagram illustrating the line sensor 11 of this embodiment.

As illustrated in FIG. 1B, in this embodiment, the line sensor 11 is constituted of 134 pixels aligned in one direction, which are necessary for detecting visible light having wavelengths of approximately 350 nm to approximately 750 nm in units of approximately 3 nm.

The line sensor 11 outputs (generates) a voltage signal (electric signal) for each pixel in accordance with intensity of the incident (received) dispersed light. Further, the output signal is AD-converted by an AD converter (not shown) so that the reflection light from the detected material 14 can be obtained as a digital intensity signal for each pixel. The line sensor 11 of this embodiment is a charge accumulation type line sensor and outputs a voltage signal for each pixel in accordance with intensity of the incident dispersed light during a predetermined accumulation period. The accumulation period can be adjusted appropriately by action of the control and operation unit 21c.

The digital intensity signal of each pixel is sent to the control and operation unit 21c for the following operation. An address number n (n=1 to 134) of each pixel of the line sensor 11 is associated with (namely, assigned with a value of) a corresponding wavelength λ in advance and is stored in a memory unit (not shown). This value assigning work can be performed by a conventionally known method by using a reference single wavelength spectrum having a known wavelength when the sensor is shipped, for example.

In this way, because each pixel is associated with the wavelength λ, it is possible to obtain a wavelength-signal intensity spectrum Oi(λ) of the reflection light from the detected material 14 based on the voltage signal output for each pixel described above.

Using this, a spectral reflectance Or(λ) of the detected material can be determined by the following equation.

$$Or(\lambda) = \{Oi(\lambda)/Wi(\lambda)\} \times Wr(\lambda) \qquad \text{Equation (1)}$$

In this equation, Wi(λ) represents the wavelength-signal intensity spectrum of the reflection light when the light source 12 emits light to a reference sample (usually, white color reference sample) having a known spectral reflectance that is separately measured. In addition, Wr(λ) represents a spectral reflectance of the reference sample itself.

Further, an operation unit (not shown) performs interpolation operation of the spectral reflectance in the range from 380 nm to 730 nm in units of 10 nm based on the obtained spectral reflectance Or(λ), and outputs the result to the outside.

Now, there is described a case where a color of a measurement object is measured by the spectral colorimetry device 10 of this embodiment.

First, the control and operation unit 21c replaces the wavelength λ indicated in Equation (1) with the pixel address n, and calculates Oi(n)/Wi(n) generated for each pixel based on an output signal Oi(n) of a white reference that has been measured in advance and an output signal Wi(n) generated when the measurement object is measured.

After that, a relationship of each pixel of the line sensor 11 associated by this correction method and a wavelength is read out from the memory unit (not shown), and the pixel address n is replaced with the wavelength λ so that Oi(λ)/Wi(λ) is obtained. Further, a value of Wr(λ) stored in the memory unit (not shown) is read out, and the spectral reflectance Or(λ) of the detected material can be obtained in accordance with Equation (1).

The spectral colorimetry device 10 of this embodiment can be applied to an electrophotographic color image forming apparatus, for example. As an example thereof, there is described a case where the spectral colorimetry device 10 is applied to a tandem color image forming apparatus adopting an intermediate transfer belt.

Figure 2:
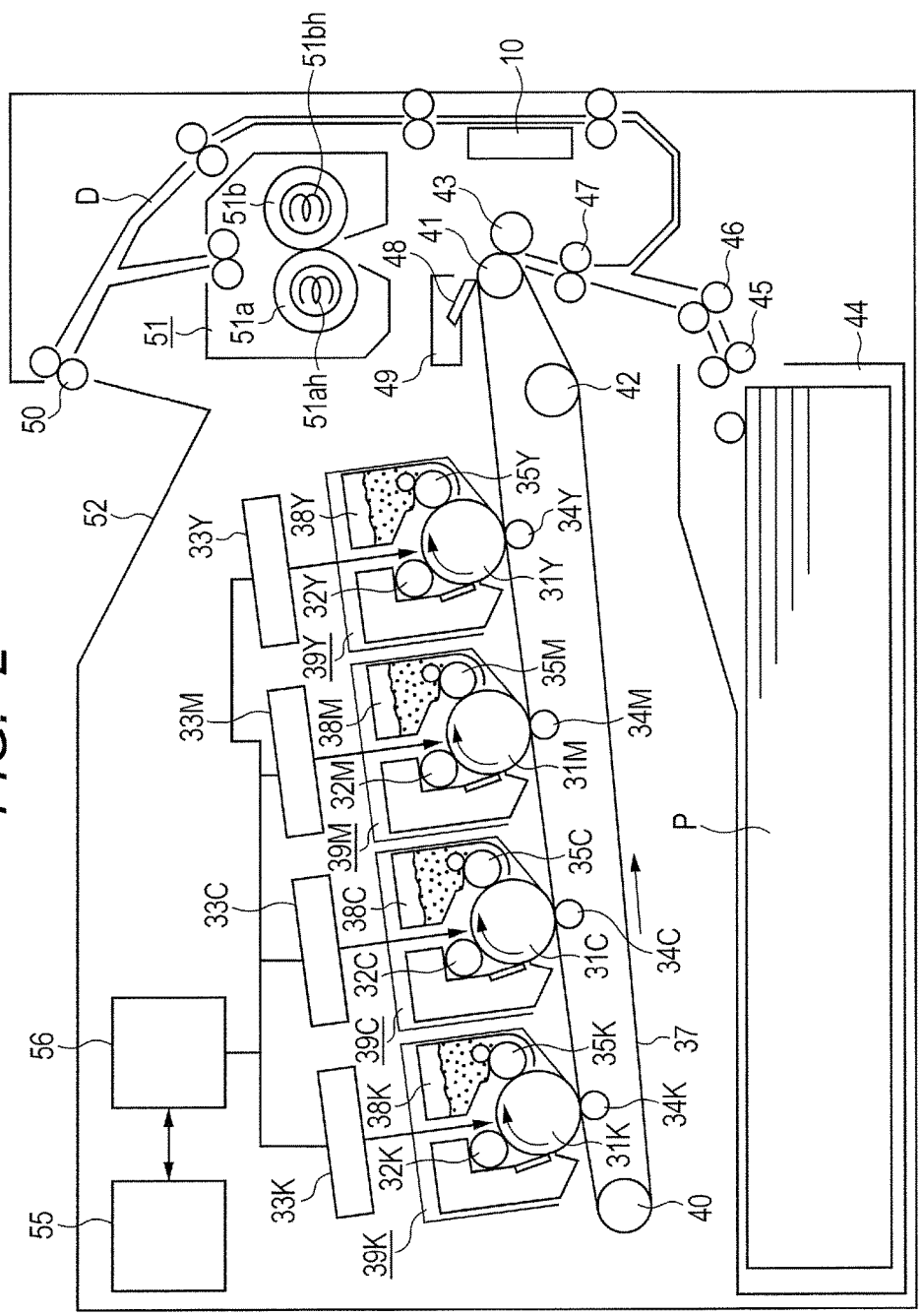
FIG. 2 is a cross-sectional view illustrating a schematic structure of an image forming apparatus to which the spectral colorimetry device of the first embodiment is applied.

FIG. 2 is a cross-sectional view illustrating a schematic structure of an image forming apparatus to which the spectral colorimetry device 10 of this embodiment is applied.

First, with reference to FIG. 2, operations of image forming units of the image forming apparatus of this embodiment are described. Here, structures and operations of individual image forming units are substantially the same except that different colors of toner (yellow (Y), magenta (M), cyan (C), and black (K)) are used. Thus, in the following description, unless it is necessary to make specific distinctions, the suffixes Y, M, C, and K each added to reference symbols of the components in FIG. 2 so as to express corresponding colors are omitted so that the components are collectively described.

The image forming unit of this embodiment is constituted of members described below.

The members include a feed unit 44, a photosensitive member for a station of each color (an image bearing member, hereinafter referred to as a photosensitive drum) 31, a charging roller 32 as a primary charging unit, an exposing light scanner 33, and a developing device 38 as a developing unit. In addition, the members include an intermediate transfer belt 37, a drive roller 41 for driving the intermediate transfer belt, a tension roller 40, an auxiliary roller 42, a primary transfer roller 34, a secondary transfer roller 43, a fixing unit 51, a control unit 55 and a controller unit 56 for controlling image formation operation of the image forming unit.

The photosensitive drum 31 is formed of an organic photoconductive layer applied around an outer periphery of an aluminum cylinder and is rotated by a drive force transmitted from a drive motor (not shown). The drive motor rotates the photosensitive drum 31 in accordance with the image formation operation in a clockwise direction in FIG. 2.

When the above-mentioned control unit 55 receives an image signal (input signal), a recording material P is sent out by pairs of feed rollers 45 and 46 from the feed unit 44 (such as a cassette) to the inside of the image forming apparatus. After that, the recording material P is temporarily nipped by a roller-like synchronous rotation member, namely a pair of conveyance (registration) rollers for synchronization between image formation operation and conveyance of the recording material P as described later, and the recording material P is stopped to wait.

On the other hand, the controller unit 56 causes the exposing light scanner 33 to form an electrostatic latent image in accordance with the received image signal on a surface of the photosensitive drum 31 charged at a predetermined potential by action of the charging roller 32.

The developing device 38 is a unit for visualizing the electrostatic latent image and performs development of a yellow (Y), magenta (M), cyan (C), or black (K) image for each station. Each developing device includes a sleeve 35 to which a developing bias is applied for visualizing the electrostatic latent image.

In this way, the electrostatic latent image formed on the surface of each photosensitive drum 31 is developed as a single color toner image by action of each developing device. The photosensitive drum 31, the charging roller 32, and the developing device 38 for each color constitute an integral structure as a toner cartridge that is mounted to a main body of the image forming apparatus in a removable manner.

The intermediate transfer belt 37 comes into contact with each photosensitive drum 31 and rotates in synchronization with rotation of each photosensitive drum 31 in a counter-clockwise direction in FIG. 2 when a color image is formed. The developed single color toner images are sequentially transferred (primarily transferred) by action of a primary transfer bias applied to each primary transfer roller 34 so as to form a multicolor toner image on the intermediate transfer belt 37.

After that, the multicolor toner image formed on the intermediate transfer belt 37 is conveyed to a secondary transfer portion (nip portion) formed between the drive roller 41 and the secondary transfer roller 43.

At the same time, the recording material P waiting in the state of being nipped between the pair of conveyance rollers 47 is conveyed to the secondary transfer portion by action of the pair of conveyance rollers 47 in synchronization with the multicolor toner image on the intermediate transfer belt 37. Further, the multicolor toner image on the intermediate transfer belt 37 is collectively transferred (secondarily transferred) onto the recording material P by action of a secondary transfer bias applied to the secondary transfer roller 43.

The fixing unit 51 melts and fixes the transferred multicolor toner image while conveying the recording material P, and the fixing unit 51 includes a fixing roller 51a for heating the recording material P, and a pressure roller 51b for bringing the recording material P into press-contact with the fixing roller 51a. The fixing roller 51a and the pressure roller 51b are each formed into a hollow shape, and heaters 51ah and 51bh are respectively provided inside. The recording material P bearing the multicolor toner image is conveyed by the fixing roller 51a and the pressure roller 51b, and heat and pressure are applied to the recording material P so that the toner is fixed to the surface of the recording material P.

The recording material P after fixing the toner image is discharged to a discharge tray 52 by a pair of discharge rollers 50 so that the image formation operation is finished. Alternatively, if image formation on the second side is performed, the recording material P is switched back (to be conveyed backward) in a discharge unit. If the image formation on the second side is performed, the recording material P bearing the multicolor toner image on the first side (on one side) passes through a duplex conveyance path D by the switch back operation in the discharge unit and is temporarily nipped by the pair of conveyance (registration) rollers 47 again to stop and wait. After that, the above-mentioned sequential image formation operation is carried out so as to perform the image formation on the second side of the recording material P.

A cleaning unit 48 removes toner remaining on the intermediate transfer belt 37 (residual toner), and the residual toner collected by the cleaning unit 48 is stored in a cleaner container 49.

The spectral colorimetry device 10 of this embodiment is arranged in a center position of the duplex conveyance path in a longitudinal direction in order to measure a color of a toner patch (a patch for colorimetry) formed on the recording material P as the detected material. The longitudinal direction herein means a direction orthogonal to the conveyance direction in an image formation plane of the recording material P conveyed in the duplex conveyance path (rotation axis direction of the photosensitive drum 31).

In the image forming apparatus of this embodiment, the control unit 55 arranged in the image forming apparatus adjusts image formation conditions of each image forming unit based on a colorimetry result of the spectral colorimetry device 10. The adjustment of image formation conditions means correction of image data, and adjustment of an exposure light amount, the developing bias, the transfer bias, and the like.

Figure 3:
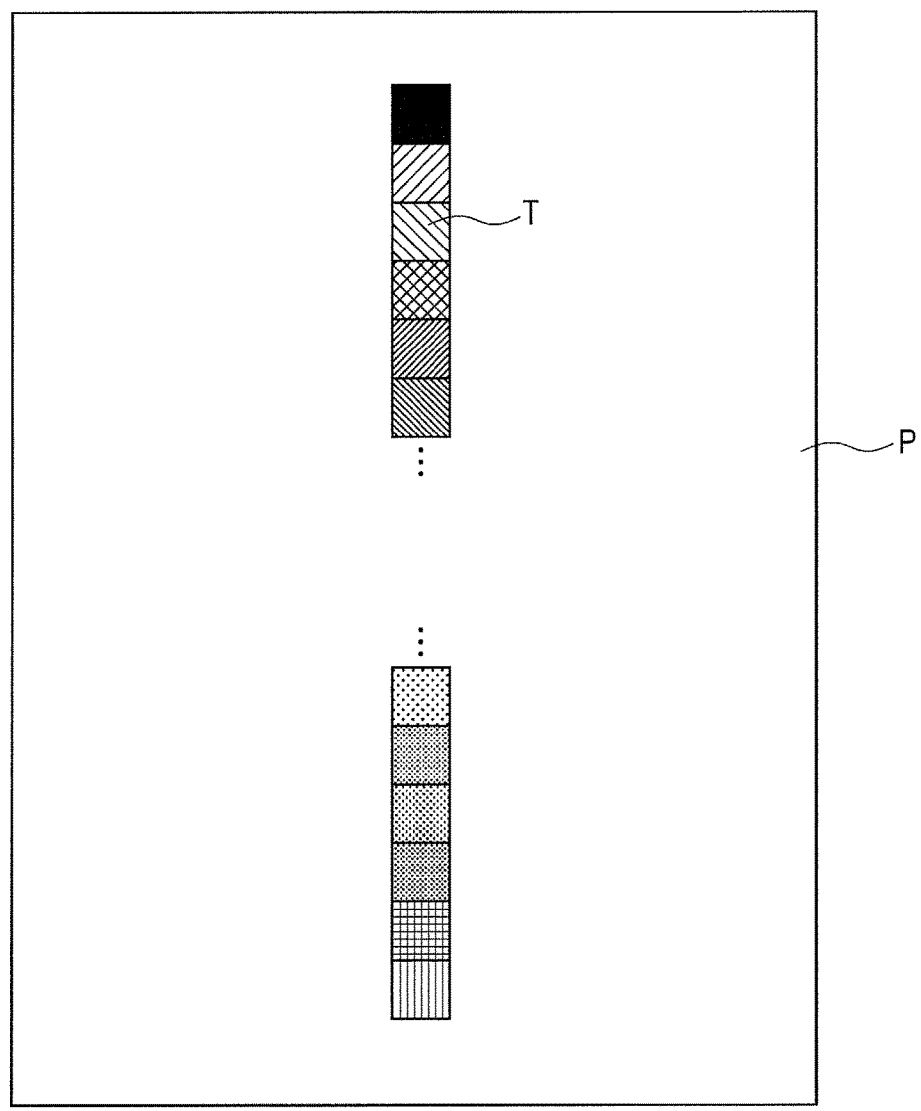
FIG. 3 is a schematic diagram illustrating a patch image for measuring color that is formed on a recording material.

Now, colorimetry operation of a toner patch by the spectral colorimetry device 10 is described. FIG. 3 is a schematic diagram illustrating the patch image T for colorimetry formed on the recording material P.

When the colorimetry operation of the toner patch is started by the spectral colorimetry device 10, the patch image T for colorimetry as illustrated in FIG. 3 is first formed on the recording material P by the above-mentioned sequential image formation operation. The recording material P after passing through the fixing unit 51 is pulled into the duplex conveyance path D by the switch back operation in the discharge unit. Then, the spectral colorimetry device 10 arranged in the duplex conveyance path D sequentially performs colorimetry of the patch image T for colorimetry formed on the recording material P in synchronization with conveyance of the recording material P. After that, the recording material P after passing through the pair of conveyance rollers 47 passes through the secondary transfer portion and the fixing unit 51 so as to be discharged onto the discharge tray 52 by the pair of discharge rollers 50.

This sequential image formation operation is controlled by the control unit 55 arranged in the image forming apparatus.

Figure 4:
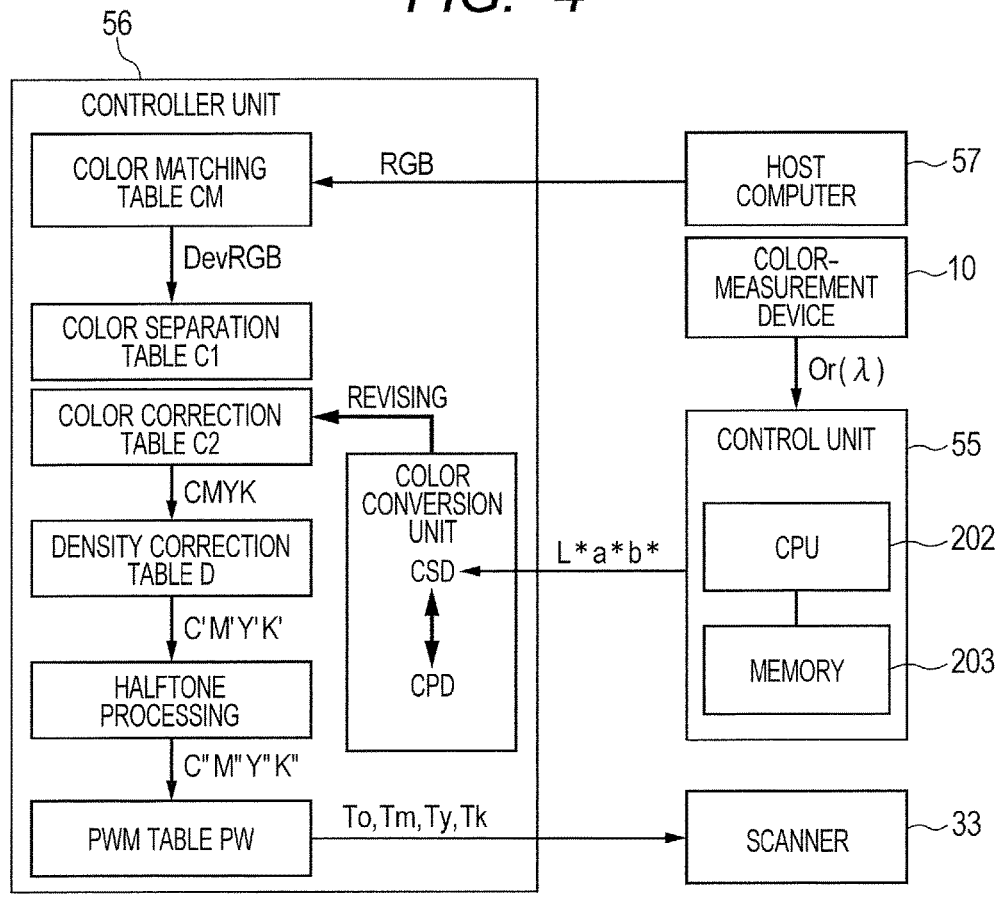
FIG. 4 is a block diagram illustrating an example of an image processing operation in the image forming apparatus of the first embodiment.

Next, an example of image processing operation in the image forming apparatus of this embodiment is described with reference to a block diagram of FIG. 4.

The controller unit 56 and the control unit 55 of the image forming apparatus are connected to each other via a video interface, and the controller unit 56 is connected to a host computer 57 of an external terminal or a network (not shown). A storage unit of the controller unit 56 stores a color matching table (CM) to be used for color conversion, a color separation table (C1), and a color correction table (C2). In addition, the control unit 55 includes a CPU 202 for processing image formation and a colorimetry result from the spectral colorimetry device 10, and a memory 203 for temporarily storing a measurement result.

When the image formation operation is started, the following processing is performed.

First, using the color matching table (CM) prepared in advance, the controller unit 56 converts an RGB signal indicating the color of the image transmitted from the host computer or the like into a device RGB signal (hereinafter referred to as DevRGB) adapted to a color reproduction range of the color image forming apparatus. Next, using the color separation table (C1) and the color correction table (C2) described later, the DevRGB signal is converted into a CMYK signal indicating toner material colors of the color image forming apparatus. Further, using a density correction table (D) for correcting a gradation and density characteristic unique to each color image forming apparatus, the CMYK signal is converted into a C'M'Y'K' signal corrected for the gradation and density characteristic. After that, halftone processing is performed so as to convert the C'M'Y'K' signal into a C"M"Y"K" signal. Then, using a PWM table (PW), the C"M"Y"K" signal is converted into exposure times Tc, Tm, Ty, and Tk of the exposing light scanners (33C, 33M, 33Y, and 33K) corresponding to the C"M"Y"K" signal. The PWM herein stands for pulse width modulation.

The controller unit 56 controls the exposing light scanners 33 in accordance with the exposure times Tc, Tm, Ty, and Tk so as to form the electrostatic latent images on the surfaces of the photosensitive drums 31C, 31M, 31Y, and 31K, respectively. Thus, the sequential image formation operation is performed as described above.

In addition, in the colorimetry operation of the toner patch image by the spectral colorimetry device 10, the patch image T for colorimetry is formed on the recording material P in accordance with multiple CMYK color patch data (CPD) stored in the controller unit 56 as color patch data in advance. The patch image T for colorimetry formed on the recording material (detected material) undergoes the colorimetry by the spectral colorimetry device 10, and the spectral reflectance Or($\lambda$) is read for each patch and is output from the control and operation unit 21c.

The read spectral reflectance data is converted into a chromaticity value (for example, CIEL*a*b*) by the control unit 55 and is sent to a color conversion unit of the controller unit 56. Further, using a color management system (CMS) (not shown), the chromaticity value is converted into CMYK data (CSD) depending on the image forming apparatus. After that, the converted CMYK data (CSD) and default color patch data (CPD) are compared so as to generate the correction table (C2) for correcting a difference between the converted CMYK data (CSD) and the default color patch data (CPD).

Such processing is performed on every patch image T for colorimetry after the colorimetry, but the patch image T for colorimetry is not always required to include all colors that can be reproduced by the image forming apparatus. For instance, it is possible to create a mixed color gray patch so as to perform only gray axis correction. For CMYK data that are not formed as the patch image for colorimetry on the recording material P, it is only necessary that interpolation processing be performed based on the patch after the colorimetry so that the correction table (C2) is generated. The correction table (C2) generated in this way is revised and stored in the controller unit 56 together with the color separation table (C1).

Next, a comparative example for clearly describing an effect of this embodiment is described.

Figure 5:
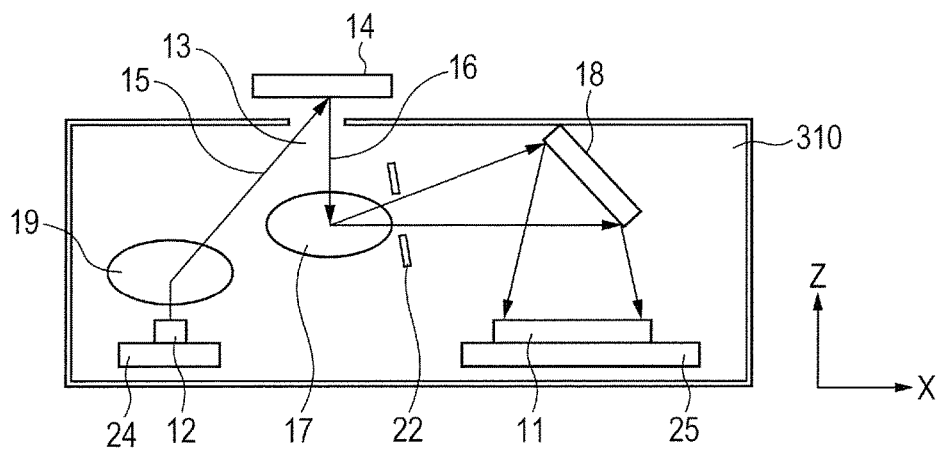
FIG. 5 is a schematic diagram of a spectral colorimetry device of a comparative example.

FIG. 5 is a schematic diagram illustrating a spectral colorimetry device 310 of the comparative example. For convenience of description, a similar component to that of this embodiment is denoted by the same reference symbol.

In the comparative example, a substrate 24 on which the light source 12 is mounted and a substrate 25 on which the line sensor 11 is mounted are different substrates.

On the other hand, as described above, in the spectral colorimetry device 10 of this embodiment, the light source 12 and the line sensor 11 are mounted on the same substrate 21. Thus, it is unnecessary to assemble the substrate 24 and the substrate 25 separately unlike the comparative example, and workability in assembling the spectral colorimetry device 10 is improved. As a result, it is possible to contribute to cost reduction.

In addition, as described above, the spectral colorimetry device 10 has a problem in that detection accuracy is lowered due to thermal deformation. This is caused by a fluctuation of the position of, in particular, the line sensor 11 due to thermal deformation (creep) of a mold resin that is suitably used for the housing of the spectral colorimetry device 10. When the position of the line sensor 11 fluctuates, association between a spectral wavelength that is intended to be detected and each pixel of the line sensor 11 is changed. As a result, the detection accuracy may be lowered.

In this embodiment, the light source 12 and the line sensor 11 are mounted on the same substrate 21, and a size of the substrate 21 of this embodiment is larger than a size of the substrate 25 of the comparative example on which only the line sensor 11 is mounted. The substrates 21 and 25 are suitably made of epoxy-resin impregnated paper or a laminated glass fiber fabric impregnated with an epoxy resin, and an influence of the thermal deformation (creep) is much smaller than that of the housing made of a mold resin. Therefore, in order to suppress a fluctuation of the position of the line sensor 11 due to the thermal deformation in the spectral colorimetry device 10, the structure of this embodiment is more advantageous than that of the comparative example.

In this embodiment, the following effect is further obtained.

As the mold resin that is suitably used for the housing, there are polycarbonate, acrylonitrile-butadiene-styrene copolymer (ABS), polyethylene, polypropylene, and the like. However, these mold resins have smaller tensile elasticity and bending strength than the epoxy resin-impregnated paper and the laminated glass fiber fabric impregnated with an epoxy resin that are suitably used for the substrate 21.

Therefore, when an external force is applied due to thermal deformation or the like of the color image forming apparatus, the substrate 21 provides a function as a reinforcing member. Thus, the effect of suppressing a positional fluctuation of the line sensor 11 is larger as the size of the substrate 21 is larger as in this embodiment. As a result, it is possible to prevent the detection accuracy from being lowered.

In addition, if the substrate 24 on which the light source 12 is mounted and the substrate 25 on which the line sensor 11 is mounted are different substrates as in the comparative example, when the housing of the spectral colorimetry device 10 is deformed thermally, positions of the substrate 24 and the substrate 25 may be fluctuated. Therefore, positions of the light source 12 and the line sensor 11 are fluctuated separately, and the detection accuracy may be lowered more significantly.

On the other hand, in this embodiment, because the light source 12 and the line sensor 11 are mounted on the same substrate 21, when the housing of the spectral colorimetry device 10 is deformed thermally, the light source 12 and the line sensor 11 follow a fluctuation of the substrate 21. Therefore, in this embodiment, decrease of the detection accuracy can be suppressed more than in the case of the comparative example in which positions of the light source 12 and the line sensor 11 are fluctuated separately.

As described above, in this embodiment, because the light source 12 and the line sensor 11 are mounted on the same substrate 21, it is unnecessary to prepare separate substrates for mounting the light source 12 and the line sensor 11 separately, and hence cost can be reduced. In addition, because the same substrate 21 is used, it is sufficient to fix the single substrate to the housing when assembling the spectral colorimetry device 10, and hence workability of assembling can be improved. As a result, it is possible to contribute to cost reduction. Further, because an influence of the thermal deformation can be reduced, it is possible to prevent the detection accuracy from being lowered.

Further, the spectral colorimetry device 10 is mounted on the image forming apparatus, the output of the patch image for colorimetry is read by the spectral colorimetry device 10 arranged in the image forming apparatus, and a color measurement result is fed back to the image formation condition. Thus, it is possible to obtain an output (image) having good color reproducibility.

Second Embodiment

Next, a second embodiment of the present invention is described with reference to FIGS. 6A and 6B. Note that, a similar component to that of the first embodiment is denoted by the same reference symbol, and description thereof is omitted.

Figure 6A:
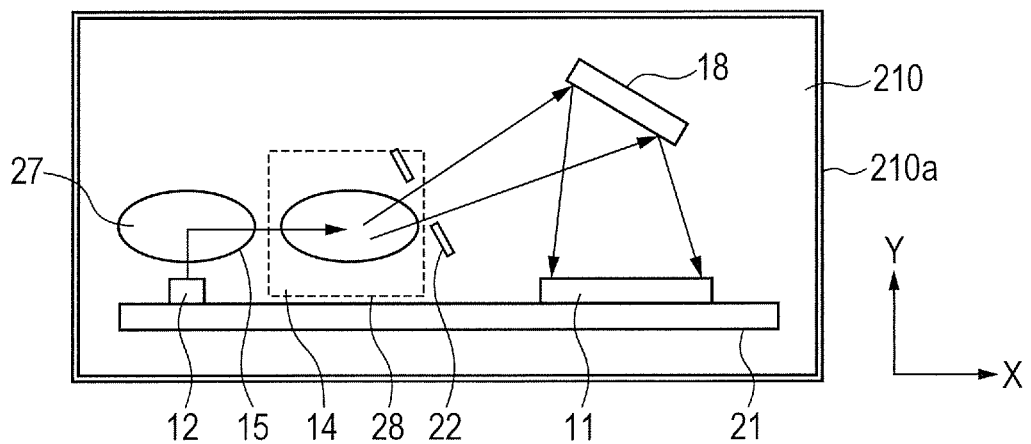
FIGS. 6A and 6B are explanatory diagrams illustrating a schematic structure of a spectral colorimetry device according to a second embodiment of the present invention. Specifically.
Figure 6B:
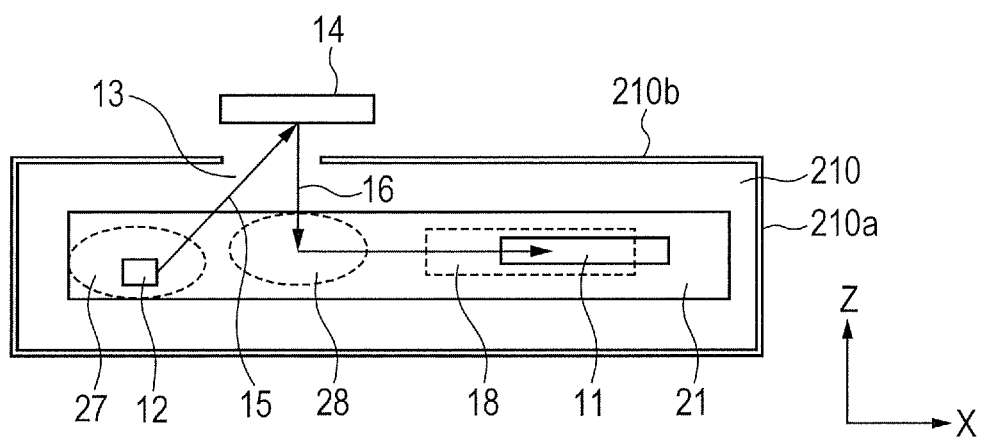

FIGS. 6A and 6B are explanatory diagrams illustrating a schematic structure of a spectral colorimetry device 210 of this embodiment. Definitions of the X direction, the Y direction, and the Z direction are the same as those in the first embodiment. FIG. 6A is a diagram illustrating an XY cross section of the spectral colorimetry device 210 as viewed from a direction perpendicular to the detected surface of the detected material (from top). In addition, FIG. 6B is a diagram illustrating an XZ cross section of the spectral colorimetry device 210 as viewed from the front of the spectral colorimetry device 210.

This embodiment has a feature in that the diffraction grating 18 and the line sensor 11 are arranged so that an optical path of light that is spectrally separated by the diffraction grating 18 and is received by the line sensor 11 (spectral light beam) becomes substantially parallel to the detected surface (surface) of the detected material 14. In other words, the center axis of the Rowland circle (not shown) of the diffraction grating 18 is parallel to the Z axis and is orthogonal to the detected surface (surface). Therefore, in this embodiment, the plane on which the diffraction grating 18 and the line sensor 11 are arranged (virtual plane) and the detected surface of the detected material 14 are substantially parallel to each other. In addition, in this embodiment, the surface of the substrate 21 on which the light source 12 and the line sensor 11 are mounted and the line sensor 11 are mounted) and the detected surface of the detected material 14 are substantially perpendicular to each other.

In the spectral colorimetry device 210 of this embodiment, the light 15 is emitted in the Y direction from the light source 12 on the substrate 21 substantially perpendicular to the detected surface of the detected material 14. Here, the detected surface of the detected material 14 is situated on the XY plane, and the surface of the substrate 21 is situated on the XZ plane.

The light 15 emitted in the Y direction is condensed by an emission light guide 27 on the emission side, and the direction of the light 15 is changed to propagate on the XZ plane by the emission light guide 27 so as to enter the detected material 14 parallel to the emission direction of the light source 12 (Y direction) at an angle of approximately 45°. The light 15 entering the detected material 14 at an angle of approximately 45° becomes scattered light in accordance with the optical absorption characteristic of the detected material 14. A part of the scattered light 16 is received by an incident light guide 28 on the incident side to become collimated light, and then the direction thereof is changed to propagate on the XY plane so as to enter the slit 22. Further, the scattered light 16 passes through the slit 22, is spectrally separated by the diffraction grating 18, and propagates along the XY plane so as to be detected by the line sensor 11.

As described above, in this embodiment, the optical path of the light spectrally separated by the diffraction grating 18 and detected by the line sensor 11 and the detected surface of the detected material 14 are situated on the XY plane so as to have a substantially parallel relationship. On the other hand, the first embodiment is different from this embodiment in that the optical path of the light that is spectrally separated by the diffraction grating 18 and is detected by the line sensor 11 is situated on the XZ plane and is substantially perpendicular to the detected surface of the detected material 14 situated on the XY plane. Here, in the first embodiment, the surface of the substrate 21 and the detected surface of the detected material 14 are substantially parallel to each other.

Figure 11A:
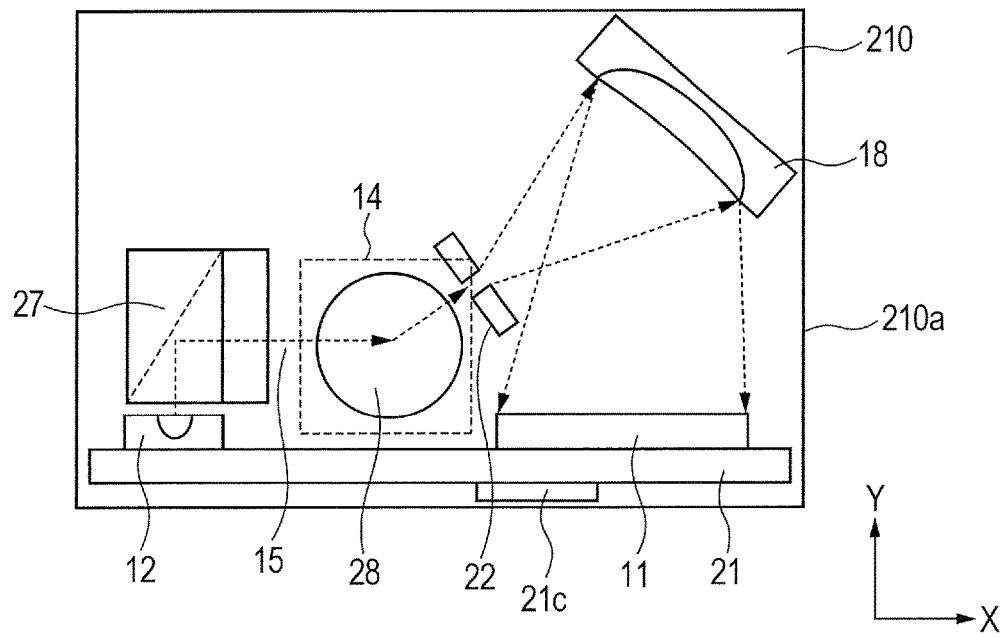
FIG. 11A is an XY cross-sectional view of a specific structure of the spectral colorimetry device of the second embodiment as viewed from a lateral direction (Z direction).
Figure 11B:
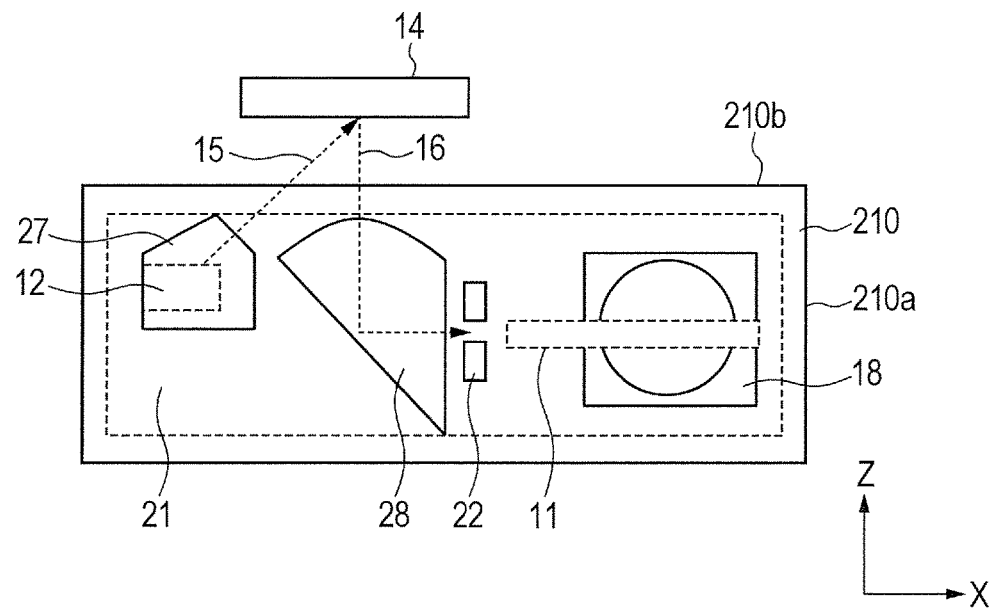
FIG. 11B is an upper side cross-sectional view (XZ cross-sectional view) of a specific structure of the spectral colorimetry device of the second embodiment.
Figure 11C:
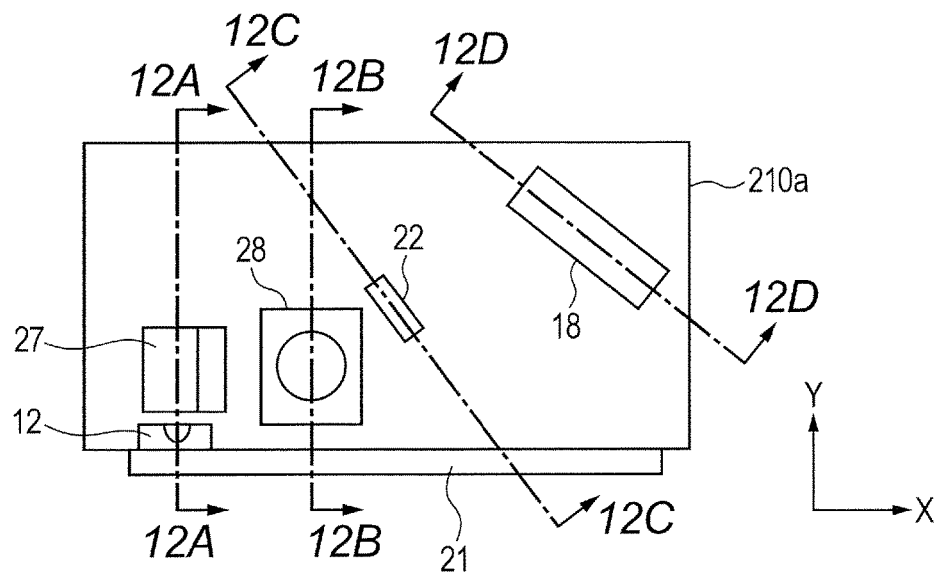
FIG. 11C is an XY cross-sectional view of a specific structure of the spectral colorimetry device of the second embodiment as viewed from the lateral direction (Z direction).
Figure 12A:
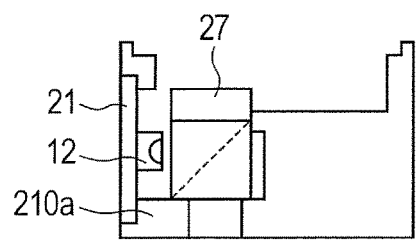
FIGS. 12A, 12B, 12C, and 12D are diagrams illustrating cross sections 12A, 12B, 12C, and 12D of FIG. 11C, respectively.
Figure 12B:
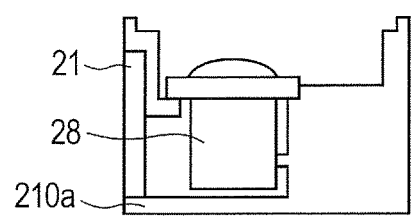
Figure 12C:
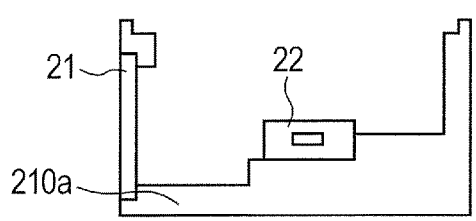
Figure 12D:
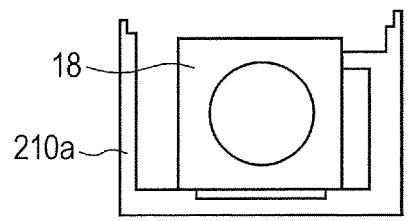

With reference to FIGS. 11A, 11B, and 11C, a more specific structure of the spectral colorimetry device 210 of this embodiment is described. FIGS. 11A and 11C are XY cross-sectional views illustrating a specific structure of the spectral colorimetry device 210 as viewed from the lateral direction (Z direction). FIG. 11B is an upper side cross-sectional view (XZ cross-sectional view) illustrating a specific structure of the spectral colorimetry device 210.

As illustrated in FIGS. 11A, 11B, and 11C, the spectral colorimetry device 210 includes a casing 210a and a lid 210b constituting the housing. The emission light guide 27, the incident light guide 28, the slit 22, the diffraction grating 18, and the substrate 21 are fixed to the casing 210a of the housing at respective positions.

Next, a method of positioning and fixing the emission light guide 27, the incident light guide 28, the slit 22, and the diffraction grating 18 to the casing 210a is described. FIGS. 12A, 12B, 12C, and 12D are diagrams illustrating cross sections 12A, 12B, 12C, and 12D of FIG. 11C, respectively. The cross section 12A illustrates a relationship between the emission light guide 27 and the casing 210a. The emission light guide 27 is positioned so as to abut against the casing 210a in the Y direction (direction of an arrow) and is fixed in this state to the casing 210a with an ultraviolet curing adhesive. Similarly, the other components, that is, incident light guide 28 (the cross section 12B), the slit 22 (cross section 12C), and the diffraction grating 18 (the cross section 12D) are positioned so as to abut against the casing 210a in the Y direction (direction of an arrow) and are fixed in this state to the casing 210a with an ultraviolet curing adhesive.

Figure 13A:
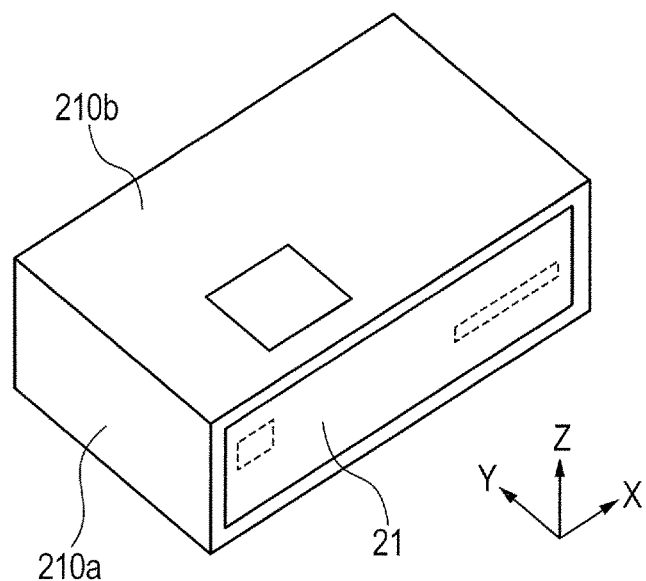
FIG. 13A is a diagram illustrating a state where the housing of the spectral colorimetry device is assembled.
Figure 13B:
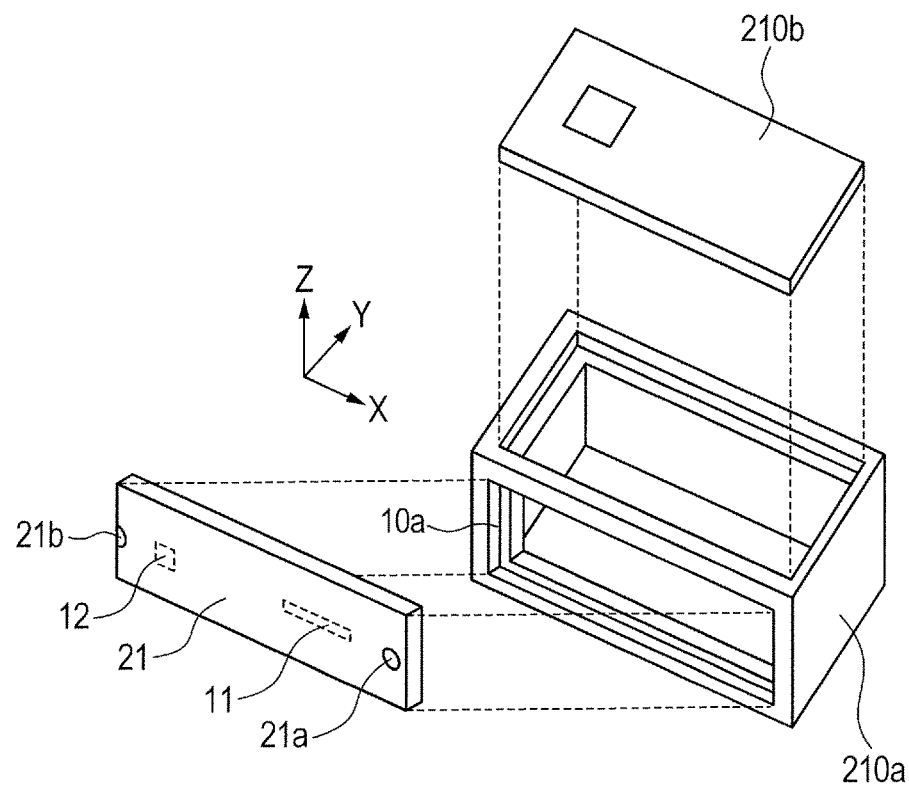
FIG. 13B is a diagram illustrating a state before the housing of the spectral colorimetry device is assembled.

Next, a relationship among the casing 210a, the lid 210b, and the substrate 21 is described in detail. FIGS. 13A and 13B are perspective views of the housing. FIG. 13A illustrates a state where the housing of the spectral colorimetry device 210 is assembled. FIG. 13B illustrates a state before the housing of the spectral colorimetry device 210 is assembled. Here, the emission light guide 27, the incident light guide 28, the slit 22, and the diffraction grating 18, which are fixed to the inside, are not illustrated in the diagrams. As understood from the diagrams, the lid 210b fixed to the casing 210a in the Z direction and the substrate 21 is fitted thereto in the Y direction. The lid 210b is positioned when the lid 210b is fitted to a groove formed in the casing 210a and is fixed with an ultraviolet curing adhesive. On the other hand, the substrate 21 is provided with the datum hole 21a serving as a reference for positioning in the X direction and in the Z direction. The datum hole 21a is fitted onto a boss (not shown) formed on the casing 210a so that the substrate 21 is positioned in the X direction and in the Z direction. Further, the notch portion 21b is formed in the substrate 21, and this portion is fitted onto a protrusion (not shown) formed on the casing 210a to serve as a rotation stopper about the Y axis for the substrate 21. The substrate 21 is fixed to the casing 210a with an ultraviolet curing adhesive.

Here, when the light subjected to the wavelength dispersion by the diffraction grating 18 is detected by the line sensor 11, in order to secure a wavelength resolution, a certain extent of optical path length is necessary for the optical path from the diffraction grating 18 to the line sensor 11.

In the structure of the first embodiment, the optical path of the light that is spectrally separated by the diffraction grating 18 and is detected by the line sensor 11 is situated on the XZ plane and is substantially perpendicular to the detected surface of the detected material 14. Therefore, in the direction perpendicular to the detected surface of the detected material 14 (Z direction), it is necessary to set the optical path length from the diffraction grating 18 to the line sensor 11 to a desired length, and it may be difficult to reduce a size (dimension) of the spectral colorimetry device 210. Here, in the following description, the size of the spectral colorimetry device 210 in the direction perpendicular to the detected surface of the detected material 14 (Z direction) is referred to as height of the spectral colorimetry device 210 (distance between two planes parallel to the detected surface) for convenience of description.

In contrast, in this embodiment, as described above, the optical path of the light that is spectrally separated by the diffraction grating 18 and is detected by the line sensor 11 is situated on the XY plane and is substantially parallel to the detected surface of the detected material 14. Therefore, in this embodiment, it is possible to set the height of the spectral colorimetry device 210 smaller than that in the structure of the first embodiment.

In the image forming apparatus of this embodiment, as illustrated in FIG. 2, the spectral colorimetry device 210 is arranged at a position opposed to the recording material P in the duplex conveyance path. In this structure, the height of the spectral colorimetry device 210 can be reduced, and hence the image forming apparatus can be downsized. In addition, there is no risk of interference between the spectral colorimetry device 210 and another member such as the secondary transfer roller 43 so that design flexibility can be enhanced.

In addition, in the first embodiment, the optical path of the light that is spectrally separated by the diffraction grating 18 and is detected by the line sensor is situated on the XZ plane and is substantially perpendicular to the detected surface of the detected material 14. Therefore, when the optical path length from the diffraction grating 18 to the line sensor 11 is set to a desired length, the optical path length from the light source 12 to the detected material 14 may be increased. In contrast, in this embodiment, the height of the spectral colorimetry device 210 can be set smaller than that in the first embodiment, and hence the optical path length from the light source 12 to the detected material 14 can be set smaller than that in the first embodiment.

Compared with the first embodiment, the optical path length from the light source 12 to the detected material 14 can be decreased to 60% in this embodiment, and the light emission amount of the light source 12 can be halved substantially. Therefore, in this embodiment, it is unnecessary to increase the light emission amount for securing the light amount emitted to the detected material 14. Therefore, it is also unnecessary to supply a large current, and hence cost increase of the circuit and the light emission element can be suppressed. As a result, cost can be reduced.

As described above, according to this embodiment, because the substrate 21 on which the light source 12 is mounted and the detected surface are substantially perpendicular to each other, it is possible to obtain the effect that the height of the spectral colorimetry device 210 in the direction perpendicular to the detected surface can be reduced in addition to the effect of the first embodiment. Further, because the optical path length from the light source 12 to the detected material 14 can be reduced, it is possible to reduce cost of the spectral colorimetry device 210.

Here, in this embodiment, the optical path of the light that is spectrally separated by the diffraction grating 18 and is detected by the line sensor 11 is situated on the XY plane and is substantially parallel to the detected surface of the detected material 14. However, the present invention is not limited thereto, it is only necessary that the optical path be situated along the XY plane (virtual plane parallel to the detected surface). In addition, in this embodiment, the surface of the substrate 21 on which the light source 12 and the line sensor 11 are mounted and the detected surface of the detected material 14 are substantially perpendicular to each other, but the present invention is not limited thereto. In other words, the surface of the substrate 21 and the detected surface of the detected material 14 need not be substantially perpendicular to each other, as long as the optical path of the light that is spectrally separated by the diffraction grating 18 and is received by the line sensor 11 to be detected by the line sensor 11 is situated along the XY plane.

In addition, with the structure of this embodiment, among sizes of the spectral colorimetry device 210, the height of the spectral colorimetry device 210 (size in a direction perpendicular to the detected surface of the detected material 14 (Z direction)) can be suppressed. In contrast, in order to suppress a size of the colorimetry device 210 in a direction parallel to the detected surface of the detected material 14 (Y direction) among the sizes of the spectral colorimetry device 210, it is preferred to use the structure of the first embodiment.

Third Embodiment

Next, a third embodiment of the present invention is described. Here, a similar component to that of the first and second embodiments is denoted by the same reference symbol, and description thereof is omitted.

This embodiment has a feature in that a region of the substrate 21 between the light source 12 and the line sensor 11 has a light transmission reducing structure for reducing light transmission (preventing a part of light emitted by the light source 12 from entering the line sensor 11 through the substrate 21).

Figure 7:
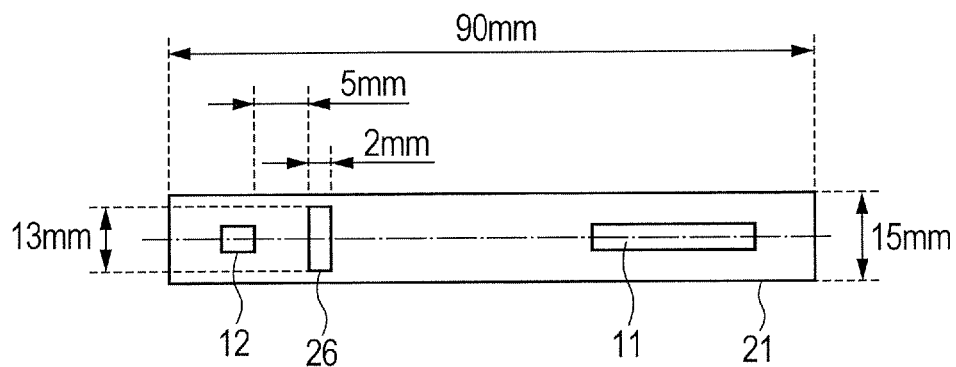
FIG. 7 is a schematic diagram illustrating a substrate of a spectral colorimetry device according to a third embodiment of the present invention.

FIG. 7 is a schematic diagram illustrating the substrate 21. The light source 12 and the line sensor 11 are mounted on the substrate 21. In addition, a hole 26 is formed in a region of the substrate 21 between the light source 12 and the line sensor 11. In this embodiment, a slit is formed as the hole 26.

In this embodiment, as illustrated in FIG. 7, the light source 12 and the line sensor 11 are arranged at the center of the substrate 21 (center in the vertical direction in FIG. 7) on the substrate 21 having a height (length in the vertical direction in FIG. 7) of 15 mm, and a width (length in the horizontal direction in FIG. 7) of 90 mm. Further, the hole 26 having a height of 13 mm and a width of 2 mm is arranged at a center position of the substrate 21 in the vertical direction in FIG. 7, which is a position that is 5 mm apart from the light source 12 in a direction toward the line sensor 11.

Thus, a part of light (stray light) emitted from the light source 12 is less likely to enter the line sensor 11 through the substrate 21. In this embodiment, the stray light that is emitted from the light source 12 through the substrate 21 so as to enter the line sensor 11 can be reduced by 98% with respect to the first embodiment.

Here, if the line sensor 11 is influenced by the stray light, the detection accuracy may be lowered. This is because the line sensor 11 detects the stray light as a disturbance component besides the light spectrally separated by the diffraction grating 18. In particular, when measuring a color of a toner patch having a low brightness in which the reflection light from the detected material becomes weaker, the decrease of the detection accuracy becomes conspicuous. Therefore, it is desired to suppress the stray light as much as possible.

Next, the reason why the stray light can be reduced in this embodiment is described in detail.

The substrate 21 is suitably made of epoxy resin-impregnated paper or a laminated glass fiber fabric impregnated with an epoxy resin. Therefore, the substrate 21 has a structure that transmits light well.

Therefore, if a part of the light emitted from the light source 12 is reflected without entering the emission light guide 19 or 27 on the emission side and enters the substrate 21, this light propagates through the substrate 21 and is detected by the line sensor 11 as stray light. In addition, if a part of the light output from the emission light guide 19 or 27 on the emission side does not propagate toward the aperture 13 but is reflected in the spectral colorimetry device 10 or 210 so as to enter the substrate 21, this light propagates through the substrate 21 and is detected by the line sensor 11 as stray light.

In this embodiment, because the hole 26 is formed as the light transmission reducing structure in the region between the light source 12 and the line sensor 11, the stray light propagating through the substrate 21 can be reduced so that the detection accuracy can be improved.

Further, the light transmission reducing structure is not limited to this structure but may be a structure in which at least a part of a region of the substrate 21 between the light source 12 and the line sensor 11 is formed of a member made of a material for reducing light transmission so that the stray light is reduced. In addition, the hole 26 described above may be formed so that the stray light is further reduced.

As the material used for the substrate 21 for reducing light transmission, it is preferred to use a mixture of an epoxy resin and a coloring agent such as carbon powder or graphite powder. In addition, it is also preferred to use ceramics such as alumina or aluminum nitride for the substrate 21.

As described above, according to this embodiment, because the light transmission reducing structure is arranged in the region of the substrate 21 between the light source 12 and the line sensor 11, it is possible to obtain the effect of suppressing lowering of the detection accuracy by the stray light in addition to the effect of the embodiments described above.

According to the present invention, it is possible to provide the colorimetry apparatus in which cost is reduced and lowering of the detection accuracy is suppressed. In addition, it is possible to provide the colorimetry apparatus that can realize downsizing of the apparatus main body.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2012-168501, filed Jul. 30, 2012, and 2013-147644, filed Jul. 16, 2013, which are hereby incorporated by reference herein in their entirety.

What is claimed is:

1. A colorimetry apparatus comprising:
a light emitting source configured to emit light to a surface of a detected material;
a diffraction grating configured to disperse reflected light in which the light emitted from the light emitting source is reflected at the detected material, for each wavelength of the reflected light;
a light receiving device including multiple pixels, the light receiving device being configured to receive the reflected light dispersed by the diffraction grating by the multiple pixels;
a common electronic circuit substrate including a common surface on which the light emitting source and the light receiving device are mounted, and on which a first circuit for controlling a light emitted from the light emitting source, and a second circuit for processing a signal output from the light receiving device are mounted; and
a housing that is a different member from the common electronic circuit substrate,
wherein the light emitting source, the diffraction grating, the light receiving device, and the common electronic circuit substrate are provided inside the housing,
wherein the light emitted from the light emitting source passes through an opening to an outside of the housing, the opening being provided on a surface of the housing at a position opposing to the detected material, and
wherein the reflected light reflected at the detected material passes through the opening into the housing.

2. A colorimetry apparatus according to claim 1, further comprising:
a first controller including the first circuit and the second circuit,
wherein the first controller is mounted on a back side surface of the common surface.

3. A colorimetry apparatus according to claim 1, wherein the diffraction grating and the light receiving device are positioned so that an optical path in which a light spectrally separated by the diffraction grating and received by the light receiving device is positioned along a virtual surface parallel to a surface of the detected material positioned at a predetermined position.

4. A colorimetry apparatus according to claim 3, wherein the common surface of the common electronic circuit substrate is perpendicular to the virtual surface.

5. A colorimetry apparatus according to claim 3, further comprising a light guide for guiding light emitted from the light emitting source into the detected material,
wherein the common electronic circuit substrate is perpendicular to the virtual surface parallel to the surface of the detected material, and
wherein an optical path of the light emitted from the light emitting source and guided by the light guide and an optical path in which a light spectrally separated by the diffraction grating and received by the light receiving device are parallel to the virtual surface.

6. A colorimetry apparatus according to claim 1, wherein the common electronic circuit substrate includes a portion whose transmission amount of a light is less than a transmission amount of light at another portion, between the light emitting source and the light receiving device.

7. A colorimetry apparatus according to claim 1, further comprising:
a first light guide for guiding light emitted from the light emitting source into the detected material; and
a second light guide for guiding light reflected on the detected material into the diffraction grating,
wherein the first light guide and the second light guide are positioned inside the housing.

8. A colorimetry apparatus according to claim 7, wherein the second light guide guides the reflected light to the diffraction grating by changing a first direction in which a light is reflected to a second direction.

9. A colorimetry apparatus according to claim 2, wherein the first controller mounted on the common electronic circuit substrate calculates a spectral reflectance of a detected object based on a signal output from the light receiving device, and sends the spectral reflectance to a second controller that is external to the colorimetry apparatus.

10. An image forming apparatus comprising:
an image forming unit configured to form an image by forming an electrostatic latent image, developing the electrostatic latent image with toner as a toner image, transferring the toner image onto a recording material, and fixing the toner image on the recording material;
a colorimetry apparatus according to claim 1, the colorimetry apparatus being configured to measure color of a patch image for colorimetry formed and fixed on the recording material; and
a controller for controlling an image forming condition of the image forming unit according to an output of the colorimetry apparatus.

11. A colorimetry apparatus comprising:
a light emitting source configured to emit light to a surface of a detected material;
a diffraction grating configured to disperse reflected light in which the light emitted from the light emitting source is reflected at the detected material, for each wavelength of the reflected light;
a light receiving device including multiple pixels, the light receiving device being configured to receive the reflected light dispersed by the diffraction grating by the multiple pixels;
a common electronic circuit substrate including a common surface on which the light emitting source and the light receiving device are mounted, and on which a first circuit for controlling a light emitted from the light emitting source, and a second circuit for processing a signal output from the light receiving device are mounted; and a housing that is a different member from the common electronic circuit substrate, wherein the light emitting source, the diffraction grating, and the light receiving device are provided inside the housing, wherein the light emitted from the light emitting source passes through an opening to an outside of the housing, the opening being provided on a surface of the housing at a position opposing to the detected material, and wherein the reflected light reflected at the detected material passes through the opening into the housing.

12. A colorimetry apparatus according to claim 11, wherein the common electronic circuit substrate is provided at a position where the common electronic circuit substrate covers an opening of the housing.

13. A colorimetry apparatus according to claim 11, further comprising:

a first controller including the first circuit and the second circuit, wherein the first controller is mounted on a back side surface of the common surface.

14. A colorimetry apparatus according to claim 13, wherein the first controller mounted on the common electronic circuit substrate calculates a spectral reflectance of a detected object based on a signal output from the light receiving device, and sends the spectral reflectance to a second controller that is external to the colorimetry apparatus.

15. A colorimetry apparatus according to claim 11, wherein the diffraction grating and the light receiving device are positioned so that an optical path in which a light spectrally separated by the diffraction grating and received by the light receiving device is positioned along a virtual surface parallel to a surface of the detected material positioned at a predetermined position.

16. A colorimetry apparatus according to claim 15, wherein the common surface of the common electronic circuit substrate is perpendicular to the virtual surface.

17. A colorimetry apparatus according to claim 15, further comprising a light guide for guiding light emitted from the light emitting source into the detected material, wherein the common electronic circuit substrate is perpendicular to the virtual surface parallel to the surface of the detected material, and wherein an optical path of the light emitted from the light emitting source and guided by the light guide and an optical path in which a light spectrally separated by the diffraction grating and received by the light receiving device are parallel to the virtual surface.

18. A colorimetry apparatus according to claim 11, wherein the common electronic circuit substrate includes a portion whose transmission amount of a light is less than a transmission amount of light at another portion, between the light emitting source and the light receiving device.

19. A colorimetry apparatus according to claim 11, further comprising:

a first light guide for guiding light emitted from the light emitting source into the detected material; and a second light guide for guiding light reflected on the detected material into the diffraction grating, wherein the first light guide and the second light guide are positioned inside the housing.

20. A colorimetry apparatus according to claim 19, wherein the second light guide guides the reflected light to the diffraction grating by changing a first direction in which a light is reflected to a second direction.

21. A colorimetry apparatus according to claim 19, wherein the light spectrally separated by the diffraction grating is received by the light receiving device without changing a direction.

22. An image forming apparatus comprising:

an image forming unit configured to form an image by forming an electrostatic latent image, developing the electrostatic latent image with toner as a toner image, transferring the toner image onto a recording material, and fixing the toner image on the recording material;

a colorimetry apparatus according to claim 11, the colorimetry apparatus being configured to measure color of a patch image for colorimetry forming and fixed on the recording material; and a controller for controlling an image forming condition of the image forming unit according to an output of the colorimetry apparatus.

* * * * *